June 6, 1944.  H. O. DROTNING  2,350,733

FILM IDENTIFICATION SIGNAL

Filed Sept. 26, 1942

HENRY O. DROTNING
INVENTOR

BY Newton M. Persne
Clarence W. Carroll
ATT'Y & AG'T

Patented June 6, 1944

2,350,733

UNITED STATES PATENT OFFICE 2,350,733

FILM IDENTIFICATION SIGNAL

Henry O. Drotning, Rochester, N. Y., assignor to Eastman Kodak Company, Rochester, N. Y., a corporation of New Jersey Application September 26, 1942, Serial No. 459,856

2 Claims. (Cl. 116—133)

This invention relates to film identification signals for photographic cameras, and a principal object thereof is to produce a device which may be easily and inexpensively applied to or built into a camera and used in such a manner that it may serve to remind the user of the particular type of film with which the camera is loaded.

Sometimes weeks elapse between the taking of two successive pictures on one roll of film because the roll is not exhausted at one time. One user may readily forget, or another user may not know, whether the camera is loaded with a fast or a slow film, or even a color film, and therefore the remainder of the roll may be incorrectly exposed and wasted.

By the addition of an identification signal which may selectively present in a visible manner the trade name or other indicium of a given film, by which its characteristics are recognizable, the correct exposure may be given and the film will be saved.

Dials or slides operating against a fixed reference mark and attached to a camera body have been suggested and placed on the market, either built-in or as an accessory attachment. Most of these create an additional protuberance on a camera, detracting from its appearance and creating another part to catch on clothing etc.

The present structure takes advantage of the fact that almost all roll film cameras have a protruding knob for winding the film. By mounting the film indicating signal on the winding knob no additional projecting parts are required, and an inexpensive construction and attractive appearance result.

To this and other ends the invention is presented in typical and preferred form in the drawing herewith, in which Fig. 1 is a top plan view of a winding knob for a camera, on an enlarged scale, with a film identification signal incorporated therein;

Figure 1:
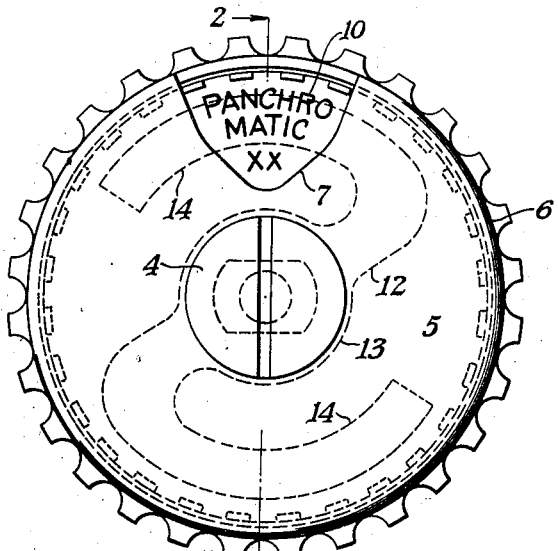
Figure 2:
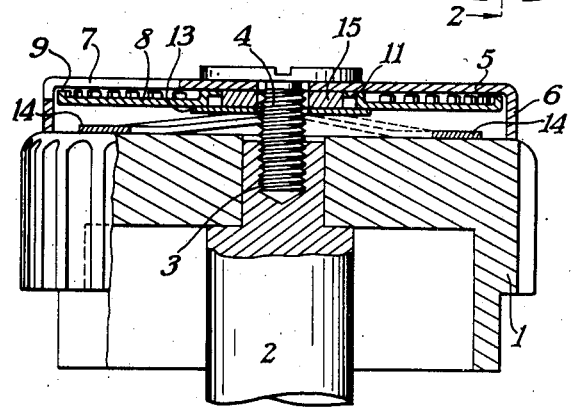
Fig. 2 is a section on line 2—2 of Fig. 1.

The usual winding knob with a serrated or fluted rim for convenient manipulation is indicated at 1, with a central bore for mounting on a shouldered stud 2 that extends into a camera to connect with a film spool. Ordinarily the knob is securely attached to the stud by a screw which enters a tapped hole 3.

In order to provide for the mounting of visible indicia on the knob, the usual screw above mentioned is replaced by a longer screw 4 which solidly holds a housing 5 with a downturned annular flange 6 into contact with the top face of the knob 1. The housing 5 is shown as having a cut-away portion or aperture 7.

Figure 3:
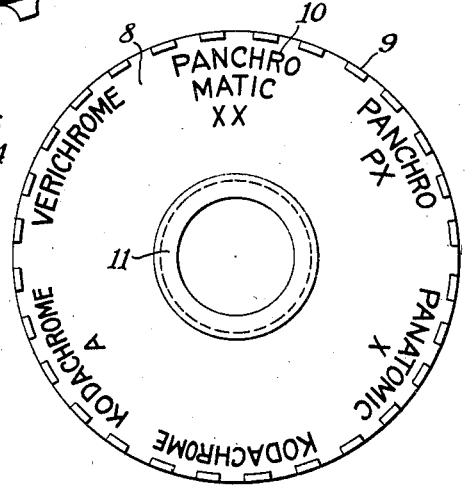
Fig. 3 is a view of the identification dial, detached from the assembly.

Within the housing 5 is a disc 8, having at its periphery a series of finger grips arranged to be accessible through the aperture 7. These grips may be various forms, but should be such that an operator may turn the disc 8, which is revoluble, merely by catching his fingernail on one of the grips, the latter comprising in the illustrated form, upstanding pressed lugs 9 at spaced intervals. They might, however, be edge serrations, surface ribs, or merely a roughened margin. The upper surface of the disc 8 bears characters 10 which are laid out so that each one may be read in the aperture 7. The charaters may be numbers, letters, or full names of film brands as in Fig. 3, and may be etched or embossed in any style on the disc.

While the disc 8 is revoluble on the screw 4 it is not completely free, because it is desirable in accomplishing one purpose of the invention, that the disc should not be accidentally moved as by jarring or by a casual contact with clothing or other objects. To this end a frictional contact is maintained between the upper surface of an embossed central portion 11 on the disc and the underside of the housing 5. This frictional contact is created by a spring 12, which in the illustrated form herewith consists of a central portion 13, pierced to loosely fit the screw 4, and spring arms 14 pressing downwardly against the smooth top face of the knob 1, so that the reaction of the spring causes a sufficiently close contact between the housing 5 and the disc 8 to prevent the latter from being turned accidentally and yet to permit it to be moved easily by intent. A washer 15 may be placed in the embossed central portion 11 of the disc 8.

Figure 4:
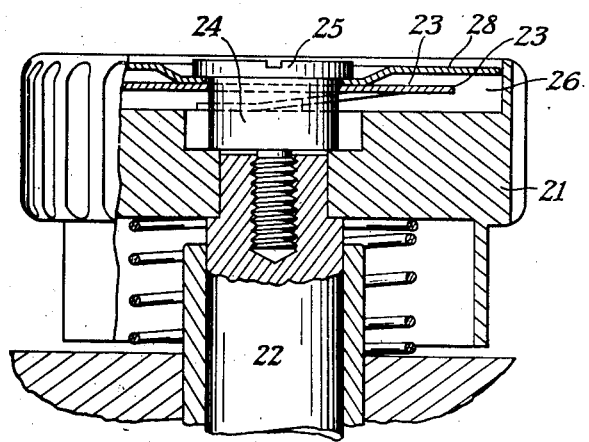
Fig. 4 is a section similar to Fig. 2, of a modified form of construction.
Figure 5:
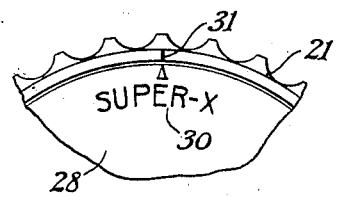
Fig. 5 is a fragmentary top view of a modified form of reference point.

Figs. 4 and 5 show a modified construction in which the winding knob 21 is secured solidly to the stud 22 by a shouldered screw 24, the head 25 of the screw being somewhat larger than the shank portion, thereby affording a seat against which the disc 28 bearing characters 30 is held frictionally by the spring 23. The knob 21 is recessed at 26 to receive the spring and the disc, so that these parts and the head of the screw 24 are all below the upper edge of the rim of the recess. A reference mark 31 may be engraved in the top of the rim of the knob, and the disc 28 may be rotated to bring any desired character opposite the mark, merely by pressure of a finger against the disc.

The identifying signal device above described is not foolproof, because it does require setting by the camera user to a position which indicates the kind of film loaded in the camera. However, if this is done when the film is ready for use, and is not disturbed, it will serve as a reminder and an identification of the contents of the camera at any time, so that anyone picking up the camera may know at once what kind of sensitized material is ready therein. Of course, if a different film is inserted after one kind is removed, the user must change the setting of the identifying disc accordingly.

When constructed as illustrated herewith, the film identification signal may be applied to an existing camera as an accessory; that is, may be attached to a camera in which no such device was provided when the camera was built. It is only necessary in such a case to provide a center stud of correct length and profile to hold the housing securely on the winding knob, said stud at the same time serving to secure the knob to the winding shaft or clutch in the camera.

I claim:

1. A film identification signal adapted to be mounted on a film-winding knob of a camera, comprising a stud threadably supported in the axis concentric with the knob, a disk rotatable about the stud and bearing film-identifying characters arcuately spaced, a spring arranged to retard rotation of the disk, and an enclosure substantially surrounding said disk, said enclosure having an aperture through which said disk is accessible for manual rotation and through which any one of said film-identifying characters may be viewed after manual rotation of said disk to a selected position.

2. A film identification signal adapted to be mounted on a film transport knob of a camera, comprising a shallow housing concentric with and substantially covering the top of said knob and having an opening near its periphery, a stud fixedly securing the housing to the knob, a disk revoluble on the stud within the housing and bearing film-identifying characters visible singly through said opening in the housing upon rotation of said disk to a desired position, and means tending to retain the disk in a selected position, the periphery of the disk being accessible through the opening in the housing so that said disk may be manually rotated.

HENRY O. DROTNING.